United States Patent
Stephan et al.

(10) Patent No.: US 8,853,333 B2
(45) Date of Patent: Oct. 7, 2014

(54) PROCESS FOR OPERATING A MIXING KNEADER

(71) Applicant: BASF SE, Ludwigshafen (DE)

(72) Inventors: Oskar Stephan, Hockenheim (DE); Monte Peterson, Perland, TX (US); Karl J. Possemiers, Schilde's-Gravenwezel (BE); Steven Lippens, Temse (BE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/887,972

(22) Filed: May 6, 2013

(65) Prior Publication Data

US 2013/0296509 A1    Nov. 7, 2013

Related U.S. Application Data

(60) Provisional application No. 61/643,384, filed on May 7, 2012.

(51) Int. Cl.
  C08F 2/01  (2006.01)
  C08F 2/00  (2006.01)
  B01F 7/04  (2006.01)
  B01F 15/06  (2006.01)
  G05D 15/00  (2006.01)
  B01J 19/18  (2006.01)

(52) U.S. Cl.
  CPC . *C08F 2/01* (2013.01); *B01F 7/041* (2013.01); *B01F 15/068* (2013.01); *B01F 2015/062* (2013.01); *B01F 2215/0472* (2013.01); *G05D 15/00* (2013.01); *B01F 15/065* (2013.01); *Y10S 526/918* (2013.01); *Y10S 526/93* (2013.01)
  USPC ............... 526/59; 526/88; 526/918; 526/930; 422/137

(58) Field of Classification Search
  USPC ........ 526/88, 918, 930, 59; 422/137; 366/132
  See application file for complete search history.

(56) References Cited

U.S. PATENT DOCUMENTS 4,769,427 A *  9/1988  Nowakowsky et al. ......... 526/64
4,873,299 A   10/1989  Nowakowsky et al.
(Continued)

FOREIGN PATENT DOCUMENTS

CA    2102577 A1    5/1994
DE    3537276 A1    4/1987
(Continued)

OTHER PUBLICATIONS

International Search Report in international application No. PCT/EP2013/058734, dated Jul. 25, 2013.

*Primary Examiner* — Fred M Teskin
(74) *Attorney, Agent, or Firm* — Marshall, Gerstein & Borun LLP

(57) ABSTRACT

The invention relates to a process for operating a mixing kneader, comprising one or more shafts on whose surfaces are disposed kneading bars and which are surrounded by a casing, comprising the following steps:
(a) supplying reactants at an addition site in the mixing kneader,
(b) converting the reactants in an exothermic reaction, the reaction at first forming a coherent kneadable intermediate,
(c) tearing and dividing the coherent kneadable intermediate to form a product, the exothermic reaction optionally continuing during the tearing and division,
(d) withdrawing the product at a withdrawal site in the mixing kneader,
wherein at least one of the shafts and/or the casing is heated to a temperature above 20° C. during the operation of the mixing kneader.

25 Claims, 1 Drawing Sheet

(56) References Cited

U.S. PATENT DOCUMENTS

| | | |
|---|---|---|
| 5,407,266 A | 4/1995 | Dotsch et al. |
| 7,393,908 B2 * | 7/2008 | Heide et al. ............ 526/318.43 |
| 2004/0186229 A1 | 9/2004 | Heide et al. |
| 2008/0004408 A1 | 1/2008 | Stueven et al. |
| 2008/0080300 A1 | 4/2008 | Stueven et al. |
| 2008/0138888 A1 | 6/2008 | Schmid |
| 2010/0171490 A1 | 7/2010 | Wei et al. |

FOREIGN PATENT DOCUMENTS

| | | |
|---|---|---|
| DE | 199 55 861 A1 | 5/2001 |
| EP | 0 238 050 A2 | 9/1987 |
| EP | 0 517 068 A1 | 12/1992 |
| EP | 0 603 525 A1 | 6/1994 |
| WO | WO-2006/034806 A1 | 4/2006 |
| WO | WO-2006/034853 A1 | 4/2006 |
| WO | WO-2008/152024 A1 | 12/2008 |
| WO | WO-2009/109563 A1 | 9/2009 |

* cited by examiner

PROCESS FOR OPERATING A MIXING KNEADER

CROSS-REFERENCE TO RELATED APPLICATIONS

This application claims the benefit of U.S. Provisional Patent Application No. 61/643,384, filed May 7, 2012, incorporated herein by reference in its entirety.

The invention relates to a process for operating a mixing kneader, comprising one or more shafts on whose surfaces are disposed kneading bars and which are surrounded by a casing, said process comprising the following steps:

(a) supplying reactants at an addition site in the mixing kneader, (b) converting the reactants in an exothermic reaction, the reaction at first forming a coherent kneadable intermediate, (c) tearing and dividing the coherent kneadable intermediate to form a product, the exothermic reaction optionally continuing during the tearing and division, (d) withdrawing the product at a withdrawal site in the mixing kneader.

Such a mixing kneader with at least two axially parallel, rotating shafts on whose surfaces are provided disk faces with kneading bars disposed on their periphery is known, for example, from EP-A 0 517 068. The kneading bars are arranged such that those on one shaft intermesh into those on the other shaft. If the shafts rotate at different speeds, the shaft rotating more slowly is referred to as the main shaft and the shaft rotating more quickly as the cleaning shaft. The number of kneading bars disposed on the main shaft and on the cleaning shaft is inversely proportional to the speed ratio. If, for example, the speed ratio of main shaft to cleaning shaft is 4:1, four times more kneading bars are disposed on the main shaft than on the cleaning shaft over the periphery of the respective shaft.

As well as mixing and kneading, the kneading bars of the cleaning shaft also serve to clean the main shaft. In order to prevent product remaining stuck to the shafts, they may be designed as described in EP-A 0 603 525, so as to be movable back and forth in an oscillating manner in axial direction.

Mixing kneaders are used, for example, in the production of superabsorbents. Superabsorbents are polymers which can absorb several times their own weight of liquid. Superabsorbents are generally used in the form of a coarse powder, for example in diapers, dressing materials, various hygiene articles, etc.

In the course of production of superabsorbents, a monomer solution and an initiator as reactants and optionally further additives are supplied to the mixing kneader at an addition site. The reactants polymerize in an exothermic reaction to give a coherent kneadable intermediate, the stiffness of the contents of the mixing kneader increasing with increasing progress of the reaction.

During the production, reactants are added continuously to the mixing kneader and product is withdrawn continuously. Over the course of the process, the contents of the mixing kneader are transported continuously from the addition site in the direction of the withdrawal site. The contents of the mixing kneader are understood to mean the reactants, the product and all intermediates.

Kneading of the contents of the mixing kneader continues while the stiffness of the coherent kneadable intermediate increases. Finally, the coherent kneadable intermediate is torn and divided by the kneading bars. At a withdrawal site in the mixing kneader, the finished product is withdrawn.

The shafts of the mixing kneader are exposed to high shear forces in the course of processing of the coherent kneadable intermediate. The greater the distance at which the kneadable intermediate is formed from the bearings of the shaft, the greater this stress is.

A further problem is the sticking of the contents of the mixing kneader to the shaft during the operation of the mixing kneader. If parts of the contents of the mixing kneader cake on a shaft, stresses which act on this shaft can lead to the formation of cracks and hence to damage to the shaft.

The prior art discloses various procedures for reducing the stress on the kneader shafts and preventing damage to the mixing kneader.

WO 2006/034853 discloses a process in which the shafts of the mixing kneader are cooled in operation. The cooling is used in order that a condensate film forms on the shaft, which prevents the product from sticking to the shaft.

WO 2006/034853 likewise discloses a mixing kneader in which the shafts are constructed and designed such that the resonant frequencies of the shafts have a separation of at least 5% from the excitation frequencies. This prevents resonances, which can result in considerable enhancement of the forces acting on the shafts.

WO 2008/152024 discloses a process for preventing excessive stresses on a shaft. Damage to the shafts of the mixing kneader is avoided by monitoring the bending of the shafts. If bending is measured beyond a particular limit, the mixing kneader can be shut down. This, however, has the disadvantage that the production capacity has to be reduced as a result. Furthermore, the coherent kneadable intermediate solidifies further when the shafts are stationary, and so problems can occur in the event of a later restart of the mixing kneader.

A reduction in the shaft stress is required since a large shaft stress leads to bending of the shafts affected and damages them. The lifetime of the shafts is limited as a result, with the consequence of frequent maintenance of the mixing kneader and associated production shutdowns.

It is an object of the invention to provide a process for the operation of mixing kneaders, in which the stress on the shafts in contact with products, the production of which forms coherent kneadable intermediates, is minimized without reducing production capacity.

This object is achieved by a process for operating a mixing kneader, comprising one or more shafts, on whose surfaces are disposed kneading bars and which are surrounded by a casing, said process comprising the following steps:

(a) supplying reactants at an addition site in the mixing kneader, (b) converting the reactants in an exothermic reaction, the reaction at first forming a coherent kneadable intermediate, (c) tearing and dividing the coherent kneadable intermediate to form a product, the exothermic reaction optionally continuing during the tearing and division, (d) withdrawing the product at a withdrawal site in the mixing kneader, wherein at least one of the shafts and/or the casing is heated to a temperature above 20° C. during the operation of the mixing kneader.

The process steps are run through continuously. In step (a), the reactants are supplied at an addition site in the mixing kneader. Preference is given to using the process proposed in accordance with the invention for production of superabsorbents, more particularly for preparation of poly(meth)acrylates.

Poly(meth)acrylates or related polymers are generally prepared by copolymerizing reactants from the groups of (I) water-soluble, monoethylenically unsaturated monomers, (II) 0.001 to 5 mol %, based on the monomers (I), of monomers comprising at least two ethylenically unsaturated double bonds and (III) 0 to 20 mol %, based on the monomers (I), of water-insoluble monoethylenically unsaturated monomers in 20 to 80% by weight aqueous solution in the presence of initiator at temperatures of 0 to 140° C.

Water-soluble monoethylenically unsaturated monomers of group (I) are, for example, ethylenically unsaturated $C_3$- to $C_6$ carboxylic acids, amides thereof and esters thereof with amino alcohols of the formula

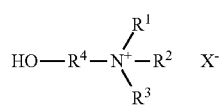 (1)

in which $R^4$ is $C_2$- to $C_5$-alkylene and $R^1$, $R^2$, $R^3$ are each independently hydrogen, methyl, ethyl or propyl. These compounds are, for example, acrylic acid, methacrylic acid, crotonic acid, itaconic acid, maleic acid, fumaric acid, and the alkali metal or ammonium salts of these acids, acrylamide, methacrylamide, crotonamide, dimethylaminoethyl acrylate, diethylaminoethyl acrylate, dimethylaminopropyl acrylate, dimethylaminobutyl acrylate, diethylaminoethyl methacrylate, dimethylaminoethyl methacrylate, dimethylaminopropyl methacrylate, dimethylaminoneopentyl acrylate and dimethylaminoneopentyl methacrylate. The basic acrylates and methacrylates are used in the form of the salts with strong mineral acids, sulfonic acids or carboxylic acids, or in quaternized form. The anion $X^-$ for the compounds or the formula 1 is the acid radical of the mineral acids or of the carboxylic acids, or methosulfate, ethosulfate or halide from a quaternizing agent.

Further water-soluble monomers of group (I) are N-vinylpyrrolidone, acrylamidopropanesulfonic acid, vinylphosphonic acid and/or alkali metal or ammonium salts of vinylsulfonic acid. The other acids may likewise be used in the polymerization either in non-neutralized form or in partially, or up to 100%, neutralized form. Suitable water-soluble monomers of group (I) are also diallylammonium compounds such as dimethyldiallylammonium chloride, diethyldiallylammonium chloride or diallylpiperidinium bromide, N-vinylimidazolium compounds such as salts or quaternization products of N-vinylimidazole and 1-vinyl-2-methylimidazole, and N-vinylimidazolines, such as N-vinylimidazoline, 1-vinyl-2-methylimidazoline, 1-vinyl-2-ethylimidazoline or 1-vinyl-2-n-propylimidazoline, each of which are likewise used in the polymerization in quaternized form or as a salt.

Preferred monomers of group (I) are acrylic acid, methacrylic acid and the alkali metal or ammonium salts of these acids, acrylamide and/or methacrylamide. These monomers may be copolymerized with one another in any ratio.

The monomers of group (I) are polymerized in the presence of crosslinkers (monomers of group (II)). The crosslinkers comprise at least two ethylenically unsaturated double bonds.

Suitable crosslinkers are, for example, N,N'-methylenebisacrylamide, polyethylene glycol diacrylates and polyethylene glycol dimethacrylates, each of which derive from polyethylene glycols of molecular weight 126 to 8500, preferably 400 to 2000, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers of ethylene oxide and propylene oxide, polyhydric alcohols, such as glycerol or pentaerythritol, di- or triesterified with acrylic acid or methacrylic acid, triallylamine, tetraallylethylenediamine, divinylbenzene, diallyl phthalate, polyethylene glycol divinyl ethers of polyethylene glycols of molecular weight 126 to 4000, trimethylolpropane diallyl ether, butanediol divinyl ether, pentaerythritol triallyl ether and/or divinylethyleneurea. Preference is given to using water-soluble crosslinkers, for example N,N-methylenebisacrylamide, polyethylene glycol diacrylate, polyethylene glycol dimethacrylate, pentaerythritol triallyl ether and/or divinylurea. The monomers of group (II) are used in the copolymerization in amounts of 0.001 to 5 mol %, preferably 0.005 to 0.5 mol %, based on the monomers (I).

When a change in the properties of the copolymers is desired, the copolymerization of the monomers of groups (I) and (II) may be carried out additionally in the presence of monomers of group (III). Useful monomers of group (III) are, for example, hydroxyethyl acrylate, hydroxypropyl acrylate, hydroxyethyl methacrylate, hydroxypropyl methacrylate, acrylonitrile and/or methacrylonitrile. Also suitable are esters of acrylic acid or methacrylic acid with monohydric alcohols having 1 to 18 carbon atoms, for example methyl acrylate, ethyl acrylate, propyl acrylate, isopropyl acrylate, n-butyl acrylate, isobutyl acrylate, hexyl acrylate, 2-ethylhexyl acrylate, stearyl acrylate, the corresponding esters of methacrylic acid, diethyl fumarate, diethyl maleate, dimethyl maleate, dibutyl maleate, vinyl acetate and vinyl propionate. When the monomers of group (III) are used to modify the water-soluble poly(meth)acrylates, 0.5 to 20 mol %, preferably 2 to 10 mol %, based on the monomers (I), is used.

The water-insoluble monomers may, if they are also used in the copolymerization, be distributed finely in the aqueous solution with the aid of emulsifiers. Suitable emulsifiers are, for example, ethoxylated nonylphenols, ethoxylated castor oil, alkyl sulfates, sorbitan fatty acid esters, ethoxylated sorbitols, ethoxylated sorbitan fatty acid esters and alkylsulfonates.

Such emulsifiers are used in an amount of 0 to 3% by weight, based on the monomers (I).

The polymerization may if appropriate be effected in the presence of the customary polymerization regulators. Suitable polymerization regulators are, for example, thio compounds, such as thioglycolic acid, mercapto alcohols, e.g. 2-mercaptoethanol, mercaptopropanol and mercaptobutanol, dodecyl mercaptan, formic acid, ammonia and amines, e.g. ethanolamine, diethanolamine, triethanolamine, triethylamine, morpholine and piperidine.

The monomers (I), (II) and optionally (III) are copolymerized with one another in 20 to 80% by weight, preferably 20 to 50% by weight and especially 30 to 45% by weight aqueous solution, in the presence of polymerization initiators. The polymerization initiators used may be any compounds which decompose to radicals under the polymerization conditions, for example peroxides, hydroperoxides, hydrogen peroxide, persulfates, azo compounds and what are known as redox catalysts. Preference is given to using water-soluble catalysts. In some cases, it is advantageous to use mixtures of different polymerization initiators, for example mixtures of hydrogen peroxide and sodium peroxodisulfate or potassium peroxodisulfate. Mixtures of hydrogen peroxide and sodium peroxodisulfate may be used in any ratio. Suitable organic peroxides are, for example, acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, tert-butyl per-3,5,5-trimethylhexanoate and tert-amyl perneodecanoate. Further suitable polymerization initiators are azo initiators, e.g. 2,2'-azobis(2-amidinopropane)dihydrochloride, 2,2'-azobis(N,N-dimethylene)isobutyramidine dihydrochloride, 2-(carbamoylazo)isobutyronitrile and 4,4'-azobis(4-cyanovaleric acid). The polymerization initiators mentioned are used in customary amounts, for example in amounts of from 0.01 to 5 mol %, preferably from 0.1 to 2 mol %, based on the monomers to be polymerized.

The redox catalysts comprise, as the oxidizing component, at least one of the above-specified "per" compounds and, as the reducing component, for example, ascorbic acid, glucose, sorbose, ammonium or alkali metal hydrogensulfite, sulfite, thiosulfate, hyposulfite, pyrosulfite or sulfide, metal salts such as iron(II) ions or silver ions, or sodium hydroxymethylsulfoxylate. The reducing component used in the redox catalyst is preferably ascorbic acid or sodium pyrosulfite. Based on the amount of monomers used in the polymerization, $1 \cdot 10^{-5}$ to 1 mol % of the reducing component of the redox catalyst system and $1 \cdot 10^{-5}$ to 5 mol % of the oxidizing component of the redox catalyst are used. Instead of the oxidizing component of the redox catalyst, or in addition, it is also possible to use one or more water-soluble azo initiators.

In the process according to the invention, preference is given to using a redox system consisting of hydrogen peroxide, sodium peroxodisulfate and ascorbic acid. In a customary embodiment, these components are used in the concentrations $1 \cdot 10^{-2}$ mol % of hydrogen peroxide, 0.084 mol % of sodium peroxodisulfate and $2.5 \cdot 10^{-3}$ mol % of ascorbic acid, based on the monomers.

The aqueous monomer solution may comprise the initiator in dissolved or dispersed form. However, the initiators may also be fed to the mixing kneader separately from the monomer solution.

Before the polymerization, the monomer solution is freed of residual oxygen. This is effected by means of inert gas which can be introduced in cocurrent, countercurrent or intermediate angles of introduction. Good mixing can be achieved, for example, with jets, static or dynamic mixers or bubble columns.

Preferably, the interior of the mixing kneader above the fill level is filled with an inert gas. The inert gases used may each independently be nitrogen, a noble gas such as argon, or other gases which do not react with the contents of the mixing kneader, for example carbon monoxide, carbon dioxide, sulfur hexafluoride. The use of mixtures of these gases is likewise conceivable. In this context, it is possible to produce a gas inert toward the contents of the mixing kneader entirely or partly by a chemical reaction in the mixing kneader. Preference is given to using nitrogen as the inert gas. The inert gas can be conducted through the mixing kneader either in cocurrent or in countercurrent to the contents. The inert gas can be supplied together with the reactants at the addition site and be withdrawn from the mixing kneader together with the product at the withdrawal site. It is likewise possible for separate inlets and outlets for the inert gas to be provided in the mixing kneader.

In a preferred embodiment of the process, the temperature of the reactants prior to entry into the mixing kneader is in the range from 5° C. to 30° C.

In process step (b) there is a reaction of the reactants supplied to the mixing kneader. In the course of this, the contents of the mixing kneader are kneaded and mixed by the kneading bars. The contents of the mixing kneader comprise the reactants, the product and all intermediates. At the start of the reaction, the reactants have only a low viscosity, and the forces acting on the shafts are low. In the course of transport from the addition site to the withdrawal site of the mixing kneader, the reactants polymerize, and the coherent kneadable intermediate is formed.

In the course of kneading of the kneadable intermediate by the mixing kneader, the shafts of the mixing kneader are stressed. In addition, the polymerization can form lumps in the coherent kneadable intermediate. These lumps are firmer than the rest of the kneadable intermediate and must be divided by the mixing kneader. In the course of division of the lumps and the mixing of the coherent kneadable intermediate, high shear forces act on the shafts, which lead to bending of the shafts. The greater the distance of the formation of the coherent kneadable intermediate from the bearings of the shaft, the greater the bending, and hence the material stress on the shaft.

In the processes according to the prior art, the polymerization reaction sets in only slowly, and the shear force caused by the coherent kneadable intermediate acts on the shaft at some distance from the bearings.

In the process according to the invention, at least one of the shafts and/or the jacket is heated to a temperature above 20° C. during the operation of the mixing kneader. The heating is preferably effected by flow of a temperature control medium through the parts to be heated.

Surprisingly, in the course of heating, there is no occurrence of the suspected effect that the contents of the mixing kneader remain stuck to the shafts without a protective water film. Instead, a distinct reduction in the bending of the shafts is observed.

Due to the heating of at least one of the shafts and/or the casing, the polymerization reaction is accelerated, and the region in the mixing kneader in which the reaction to form the coherent kneadable intermediate reaches its maximum moves closer to the addition site.

In processes according to the prior art, the polymerization reaction sets in only slowly. The reaction maximum is not attained until the contents of the mixing kneader have covered about half the distance between the addition site and the withdrawal site of the mixing kneader.

As a result of the heating of at least one shaft and/or of the casing the coherent kneadable intermediate forms closer to the addition site. As a result, the forces which occur in the course of kneading of the intermediate and in the course of dissolution of lumps act on the shafts at a site closer to the bearings. The forces transmitted to the shafts can be transmitted to the bearings with lower bending of the shaft.

A further advantageous effect of the process is a reduction in the torsion stress on the shafts. Torsion stress occurs when the rotation of the shaft is opposed by a non-uniform resistance over the length of the shaft. This is the case in the mixing kneader as a result of the changing consistency of the contents in the course of polymerization and subsequent division.

As a result of the use of the process according to the invention, the polymerization reaction is accelerated and the consistency of the processed contents of the mixing kneader is more homogeneous over the length of the shafts exposed to the contents.

Temperature control of the mixing kneader by means of a temperature control medium is particularly preferred, since the coherent kneadable intermediate is formed in an exothermic reaction. In contrast to electrical heating or heating by means of induction, a temperature control medium can absorb and remove and/or distribute the heat which arises in the process.

In the case of use of a temperature control medium, in one embodiment, the mixing kneader is heated by means of at least one of the shafts. The shafts used for heating are configured as hollow shafts, and the temperature control medium flows through them. The inlet for the temperature control medium may be arranged on one side of the shaft, and the outlet on the other side of the shaft. According to the side of the shaft on which the inlet is arranged, the temperature control medium flows through the shaft in cocurrent with the contents in the mixing kneader, or in countercurrent.

However, another possible embodiment is one in which both the inlet and the outlet for the temperature control medium are on the same side of the shaft. In this case, the temperature control medium flows within an inner channel of the shaft at first to the opposite end, in order then to run back in an outer channel surrounding the inner channel. The geometry of the outer channel may, for example, have a ring or spiral shape. A meandering course of the channel adapted to the cylinder shape is also possible. It is likewise possible to pass the temperature control medium through the shaft in the reverse direction, such that the temperature control medium flows into the outer channel and runs back through the inner channel. In both embodiments the temperature control medium can run through the outer channel of the at least one shaft either in cocurrent or in countercurrent to the contents of the mixing kneader, by providing the connections on the corresponding side of the shaft.

In addition to or in place of at least one of the shafts, the casing can also be heated. For this purpose, the casing is designed as a jacket which forms a gap through which the temperature control medium flows. The temperature control medium can run through the casing either in cocurrent or in countercurrent to the contents of the mixing kneader. Another possibility is a flow direction at right angles to the running direction of the contents of the mixing kneader. Also conceivable is a combination of such a crossflow with passage in flow direction or counterflow direction, by passing the temperature control medium through the jacket, for example, in a meandering manner.

Suitable temperature control media are liquid and gaseous media, especially water, steam, a thermal oil or a salt melt.

The temperature that the temperature control medium has prior to entry into the at least one shaft and/or the casing is called inlet temperature. The temperature of the temperature control medium measured after flow through the at least one shaft and/or the casing is referred to as outlet temperature.

The inlet temperature of the temperature control medium is typically between 20° C. and 99° C., preferably in the range from 20° C. to 60° C. and more preferably in the range from 30° C. to 60° C. In the course of flow through the at least one shaft and/or the casing, the temperature control medium absorbs heat, which arises in the course of the exothermic polymerization reaction in the interior of the mixing kneader. As a result, the outlet temperature is generally above the inlet temperature. The temperature increase depends on the heat of reaction released, the physical properties of the temperature control medium and the volume flow rate of the temperature control medium. For a given temperature control medium, the temperature increase or the absorption of heat of reaction from the mixing kneader can be adjusted via the volume flow rate of the temperature control medium.

In the case of use of water, it is preferred when the temperature control medium is heated up to its boiling temperature by the absorption of the heat of reaction. The boiling point of the temperature control medium can optionally be increased by the use of an operating pressure above atmospheric pressure. The outlet temperature of the temperature control medium is typically in the range from 20° C. to 120° C.

In addition, the temperature of the temperature control medium should never exceed the decomposition temperature of the materials processed in the mixing kneader, or the boiling temperature of the mixture present in the mixing kneader. In the case of preparation of poly(meth)acrylates used as superabsorbents, the upper limit defined by the decomposition temperature is typically approx. 200° C.; the boiling point of the mixture present is typically below 120° C. The outlet temperature of the temperature control medium is preferably in the range from 20° C. to 110° C., such that the temperature of the temperature control medium is below the boiling point of the mixture present in the mixing kneader. The volume flow rate of the temperature control medium is selected so as to comply with the outlet temperature.

The temperature control medium used is preferably water with an inlet temperature into the shaft or the casing in the range from 20° C. to 99° C. The inlet temperature of the temperature control medium is preferably in the range from 20° C. to 60° C., more preferably in the range from 30° C. to 60° C. The outlet temperature of the temperature control medium in the case of use of water is preferably in the range from 20° C. to 110° C., more preferably in the range from 60° C. to 110° C. and most preferably in the range from 80° C. to 105° C.

In one process variant, the at least one shaft and/or the casing is preheated in the course of startup, prior to the addition of the reactants.

In a preferred embodiment of the process, the bending of the at least one shaft is measured and the inlet temperature of the temperature control medium is regulated as a function of the bending.

The bending of the shaft can be determined via a measurement of the deviation of the shaft from the radial position. The radial position can be detected, for example, by means of at least two measurement transducers radially offset from one another, or another process known to those skilled in the art.

Preference is given to defining an upper limit and a lower limit for the bending. On exceedance of the upper limit, the stress on the shaft is too high, and measures have to be taken to lower the bending. When the bending goes below the lower limit, these measures can be removed again.

When the bending determined in the at least one shaft is above the upper limit, the inlet temperature of the temperature control medium is increased. This accelerates the polymerization reaction and alters the distribution of the forces acting on the at least one shaft such that the maximum of the forces is shifted in the direction of the addition site. The forces thus act on the shaft closer to the bearing on the reactant side, and the bending of the at least one shaft is reduced.

A change in the temperature of the temperature control medium also alters the temperature within the mixing kneader and thus influences the reactions which proceed within the mixing kneader. Since this can also affect the end product or the quality thereof, an unnecessary temperature increase is undesirable. Preference is accordingly given to lowering the inlet temperature of the temperature control medium if the bending determined in the at least one shaft is below the lower limit, or if required by the quality of the product.

In process step (c), kneading of the coherent kneadable intermediate by the kneading bars continues, while the stiffness thereof increases. Finally, the coherent kneadable intermediate is torn and divided by the kneading bars. In the course of tearing of the coherent kneadable intermediate, forces continue to act on the shafts until the division of the product to a free-flowing state is complete.

In the region of the withdrawal site of the mixing kneader, the product is divided and exerts only minor stresses on the kneader shafts.

In the last process step (d) the product is withdrawn at the withdrawal site of the mixing kneader.

The invention is described in detail hereinafter by drawings.

DETAILED DESCRIPTION OF THE INVENTION

Figure 1:
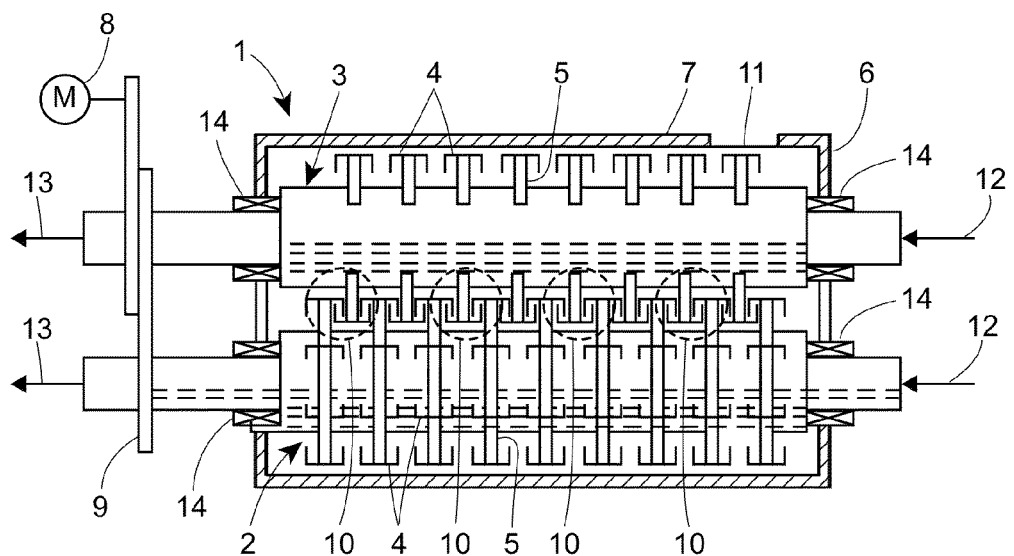
FIG. 1 a section through a mixing kneader in top view.

A mixing kneader 1, as shown in FIG. 1, comprises a main shaft 2 and a cleaning shaft 3. Both on the main shaft 2 and on the cleaning shaft 3 are disposed kneading bars 4 distributed over the periphery, which are connected to the main shaft 2 or cleaning shaft 3 by connecting elements 5. In the embodiment shown here, eight kneading bars 4 are disposed on the main shaft 2, distributed over the circumference of the main shaft 2. In contrast, only two kneading bars 4 are disposed on the cleaning shaft 3, distributed over the circumference.

The kneading bars 4 are preferably U-shaped and—as shown in FIG. 1—intermesh on the side on which the cleaning shaft 3 and the main shaft 2 are adjacent. As a result, the cleaning shaft 3 removes the material which collects on the main shaft between the connecting elements. In the embodiment shown here, in which eight kneading bars 4 are disposed on the main shaft 2, distributed over the circumference, and two kneading bars 4 on the cleaning shaft 3, the cleaning shaft 3 rotates four times as fast as the main shaft 2. This ensures that the kneading bars 4 of the cleaning shaft 3 intermesh into all kneading bars 4 of the main shaft 2. As well as the embodiment shown here with eight kneading bars 4 on the main shaft 2 and two kneading bars 4 on the cleaning shaft 3, any other combination of kneading bars 4 on cleaning shaft 3 and main shaft 2 is conceivable. The number of kneading bars 4 on the main shaft 2 and the cleaning shaft 3 is used to adjust the speed ratio of main shaft 2 to cleaning shaft 3.

The main shaft 2 and the cleaning shaft 3 are surrounded by a housing or casing 6. In order to enable temperature control of the mixing kneader 1, the housing 6 is preferably designed with a jacket. This forms a gap 7 in the housing, through with a temperature control medium can flow.

The shafts are preferably driven by means of a motor 8 and a drive 9. The drive defines the speed of the shafts 2, 3. Thus, it is possible that the main shaft 2 and the cleaning shaft 3 rotate at different speeds; it is also possible that the main shaft 2 and the cleaning shaft 3 rotate at the same speed; in addition, the main shaft 2 and the cleaning shaft 3 can be operated either in the same sense or in opposite senses.

In the housing 6, above the main shaft 2 and the cleaning shaft 3, there are orifices 10, which are shown here by dotted lines. Reactants can be supplied to the mixing kneader 1 via the orifices 10. It is also possible that the product produced in the mixing kneader 1 is degassed by means of the orifices 10.

For product withdrawal, an orifice 11 is formed in the housing 6. The orifice 11 for product withdrawal is preferably arranged on the side of the cleaning shaft 3, but can also be arranged on the side of the main shaft 2.

The main shaft 2 and the cleaning shaft 3 extend, in the embodiment shown in FIG. 1, over the entire length of the mixing kneader 1 and are mounted at both ends. For the mounting of the shafts 2, 3, bearings 14 are disposed at each end of the mixing kneader 1.

The main shaft 2 and the cleaning shaft 3 are heated by flow of a temperature control medium through them. The arrows labeled with reference numeral 12 show the site at which the temperature control medium is supplied to the main shaft 2 or cleaning shaft 3. At the site labeled with reference numeral 13, the temperature control medium is withdrawn again from the main shaft 2 or cleaning shaft 3. As well as the temperature control of the cleaning shaft 3 or main shaft 2 in countercurrent shown here, temperature control of the shafts 2, 3 in cocurrent is also possible. In the case of temperature control in cocurrent, the temperature control medium is applied counter to the arrow direction at the site labeled with reference numeral 13, and withdrawn at the site labeled with reference numeral 12.

Figure 2:
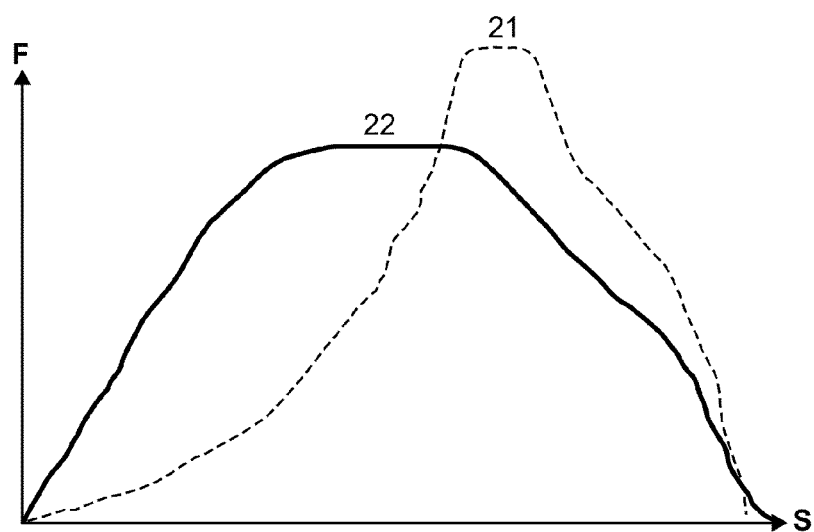
FIG. 2 a sketch of the profile of the forces acting on a kneader shaft as a function of the distance covered by the contents of the mixing kneader.

FIG. 2 shows, in comparison, the location-dependent force acting on a shaft of the mixing kneader in the course of cooling according to the prior art, and in the course of inventive heating of the shafts. The location is based on the distance covered by the contents of the mixing kneader, and is reported in % based on the distance between the addition site and the withdrawal site of the mixing kneader.

The first curve 21 shown as a dotted line shows the profile of the force acting in a process for operating a mixing kneader according to the prior art. The reaction to form the coherent kneadable intermediate proceeds only very slowly close to the addition site. This leads to a force profile with low stress on the shafts close to the bearings and high stress in the middle part of the shafts. Given the same force, the closer the action of the force on the shaft is to the middle of the shaft, the greater the bending and hence the damage to the shafts. Typically, the greatest stress caused by the coherent kneadable intermediate occurs at about half the distance between the addition site and the withdrawal site of the mixing kneader.

The second curve 22, shown as a continuous line, shows the profile of the force acting in the case of employment of the process proposed in accordance with the invention. The reaction to form the coherent kneadable intermediate is distinctly accelerated, and the region with the greatest force acting on the shafts is closer to the addition site of the mixing kneader. Since the location at which the force acts is closer to the bearings at the reactant end of the shafts compared to the prior art, the force can be transmitted to the bearings with lower bending of the shaft. The reaction additionally proceeds more uniformly, and the maximum force which occurs is reduced.

LIST OF REFERENCE NUMERALS

1 Mixing kneader
2 Main shaft
3 Cleaning shaft
4 Kneading bars
5 Connecting element
6 Housing
7 Gap
8 Motor
9 Drive
10 Orifice
11 Orifice
12 Temperature control medium inlet
13 Temperature control medium outlet
14 Bearing
21 First curve
22 Second curve

The invention claimed is:

1. A process for operating a mixing kneader, comprising one or more shafts on whose surfaces are disposed kneading bars and which are surrounded by a casing, comprising the following steps:
    (a) supplying reactants at an addition site in the mixing kneader,
    (b) converting the reactants in an exothermic reaction, the reaction at first forming a coherent kneadable intermediate,
    (c) tearing and dividing the coherent kneadable intermediate to form a product, the exothermic reaction optionally continuing during the tearing and division,
    (d) withdrawing the product at a withdrawal site in the mixing kneader,
    wherein at least one of the shafts and/or the casing is heated to a temperature above 20° C. during the operation of the mixing kneader and the temperature is maintained using a temperature control medium, and wherein a bending of the at least one shaft is measured and an inlet temperature of the temperature control medium is regulated as a function of the bending.

2. The process according to claim 1, wherein the temperature control medium flows through the at least one shaft.

3. The process according to claim 1, wherein the casing is designed as a jacket, and the jacket forms a gap through which the temperature control medium flows.

4. The process according to claim 2, wherein the inlet temperature of the temperature control medium is increased to accelerate the reaction forming the coherent kneadable intermediate of step b) if the measured bending of the at least one shaft is above a given upper limit.

5. The process according to claim 2, wherein the inlet temperature of the temperature control medium is lowered if the measured bending of the at least one shaft is below a lower limit.

6. The process according to claim 2, wherein the temperature control medium runs through the at least one shaft and/or the jacket in cocurrent or in countercurrent to the contents of the mixing kneader.

7. The process according to claim 2, wherein the temperature control medium is water, steam, a thermal oil or a salt melt.

8. The process according to claim 2, wherein the inlet temperature of the temperature control medium is between 20° C. and 99° C.

9. The process according to claim 2, wherein the maximum temperature of the temperature control medium is below a decomposition temperature of the materials present in the mixing kneader and/or boiling temperature of the mixture present in the mixing kneader.

10. The process according to claim 2, wherein the outlet temperature of the temperature control medium is between 20° C. and 120° C.

11. The process according to claim 1, wherein at least one shaft and/or the casing is preheated prior to the addition of the reactants.

12. The process according to claim 1, wherein the temperature of the reactants prior to entry into the mixing kneader is between 5° C. and 30° C.

13. The process according to claim 1, wherein the reactant added is a water-soluble, monoethylenically unsaturated monomer.

14. The process according to claim 13, wherein a further reactant added is a crosslinker comprising at least two ethylenically unsaturated double bonds.

15. The process according to claim 13, wherein a further reactant added is a water-insoluble monoethylenically unsaturated monomer.

16. The process according to claim 13, wherein a further reactant added is a polymerization initiator.

17. The process according to claim 3, wherein the inlet temperature of the temperature control medium is increased if the measured bending of the at least one shaft is above a given upper limit.

18. The process according to claim 3, wherein the inlet temperature of the temperature control medium is lowered if the measured bending of the at least one shaft is below a lower limit.

19. The process according to claim 3, wherein the temperature control medium runs through the at least one shaft and/or the jacket in cocurrent or in countercurrent to the contents of the mixing kneader.

20. The process according to claim 3, wherein the temperature control medium is water, steam, a thermal oil or a salt melt.

21. The process according to claim 3, wherein the inlet temperature of the temperature control medium is between 20° C. and 99° C.

22. The process according to claim 3, wherein the maximum temperature of the temperature control medium is below a decomposition temperature of the materials present in the mixing kneader and/or boiling temperature of the mixture present in the mixing kneader.

23. The process according to claim 3, wherein the outlet temperature of the temperature control medium is between 20° C. and 120° C.

24. The process according to claim 2, wherein the inlet temperature of the temperature control medium is lowered if the quality of the product withdrawn decreases.

25. The process according to claim 3, wherein the inlet temperature of the temperature control medium is lowered if the quality of the product withdrawn decreases.

* * * * *